United States Patent [11] 3,624,373

[72] Inventor Ronald H. Birchall
Wheaton, Ill.
[21] Appl. No. 885,568
[22] Filed Dec. 16, 1969
[45] Patented Nov. 30, 1971
[73] Assignee Bell Telephone Laboratories, Incorporated
Berkeley Heights, N.J.

[54] APPARATUS FOR PERFORMING AND CHECKING LOGICAL OPERATIONS
5 Claims, 1 Drawing Fig.

[52] U.S. Cl. .......... 235/153, 235/152, 235/156, 329/92
[51] Int. Cl. .......... G06f 11/02, G06f 7/38
[50] Field of Search .......... 235/153, 156, 168, 152; 328/92, 159; 307/216

[56] References Cited
OTHER REFERENCES
Sellers, Hsiao, and Bearnson, Error Detecting Logic For Digital Computers, McGraw-Hill, 1968, pp. 129- 134 and 172- 176, Copy in 230.

*Primary Examiner*—Charles E. Atkinson
*Attorneys*—R. J. Guenther and Kenneth B. Hamlin

ABSTRACT: Implementation and checking of any one of the logical functions AND, OR, EXCLUSIVE-OR and IDENTITY of two $n$-bit operands A and B are accomplished by applying A and B to a carry-save adder. In addition an $n$-bit control quantity C, which is selected to be either an all-"1" or an all-"0" word, is also applied to the adder. One output of the adder is a form of the desired logical function. The other output thereof is available for residue code checking of whether or not the logical operation has been correctly performed.

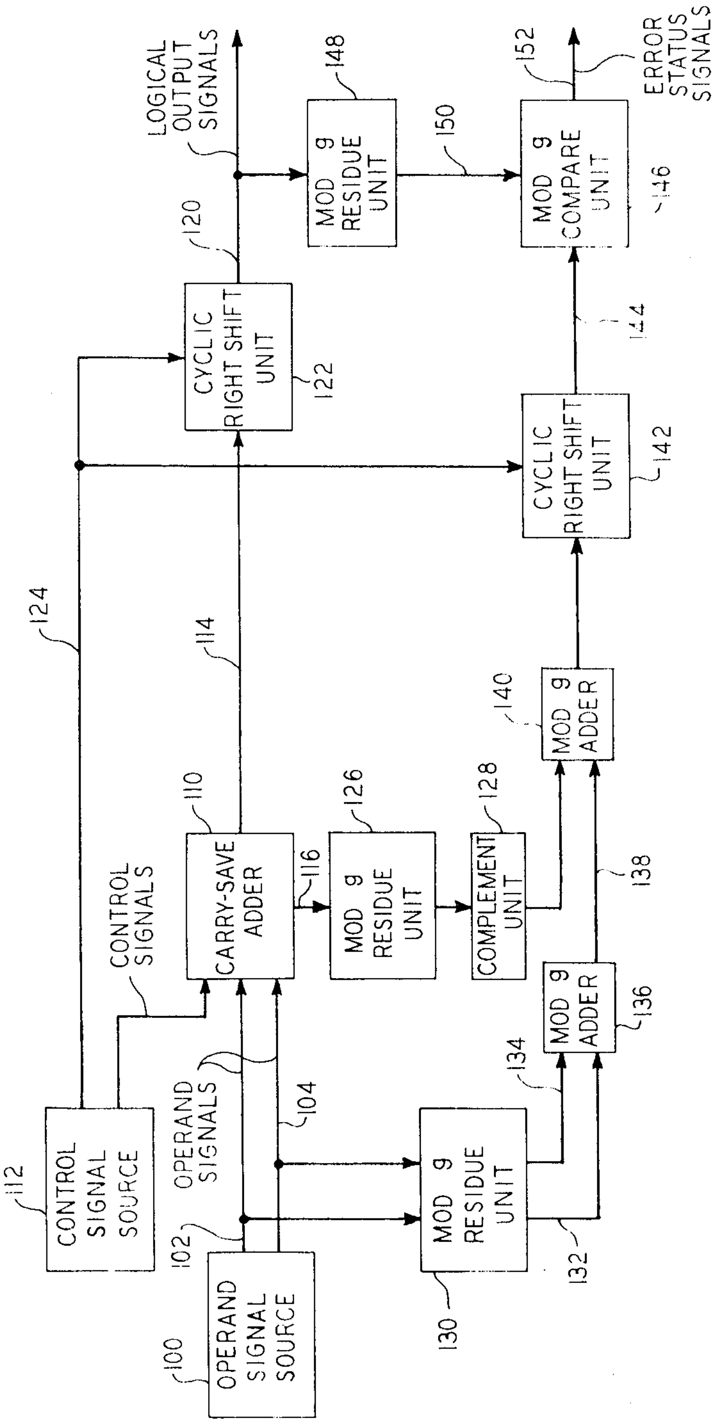
INVENTOR
R. H. BIRCHALL
BY *Lucian C. Canepa*
ATTORNEY

APPARATUS FOR PERFORMING AND CHECKING LOGICAL OPERATIONS

This invention relates to selectively controlling the translation of electrical signals and more particularly to apparatus for performing and checking logical operations in a digital information processing system.

BACKGROUND OF THE INVENTION

It is known that the detection of errors in a digital adder can be realized by utilizing residue-class-coding techniques. The extension of these techniques to the other arithmetic operations (subtraction, multiplication and division) is straightforward. Moreover, in "Error Checking Logic for Arithmetic-type Operations of a Processor," IEEE Transactions on Computers, Vol. C-17, pp. 845–849, Sept. 1968, T. R. N. Rao describes the application of residue-class-coding techniques to the arithmeticlike operations of complementing, shifting and rotating. However, no one heretofore has proposed a way of checking logical operations such as AND, OR, EXCLUSIVE-OR and IDENTITY in a manner that is compatible with the techniques utilized for the arithmetic and arithmeticlike operations. Such an extension of residue-class-coding techniques to include these logical operations is an important step in the development of a self-checking processing system.

SUMMARY OF THE INVENTION

An object of the present invention is an improved information processing system.

More specifically, an object of this invention is a processing system in which the logical operations of AND, OR, EXCLUSIVE-OR and IDENTITY are implemented and at the same time checked by residue-class coding techniques.

These and other objects of the present invention are realized in a specific illustrative embodiment thereof that comprises a carry-save adder having first and second outputs. Generation and checking of the logical functions AND, OR, EXCLUSIVE-OR and IDENTITY of two $n$-bit operands A and B are accomplished by applying A and B to the adder. In addition, an $n$-bit control quantity C, which is either an all- 1 or an all- 0 word, is also applied to the adder. For one specified value of C the first output of the adder is representative of the EXCLUSIVE-OR function of A and B and the second output thereof is available for manipulation by residue-class coding techniques to provide a check quantity. In turn, this quantity is compared with a second check quantity derived from the EXCLUSIVE-OR representation itself. The result of the comparison operation is indicative of whether or not an error (caused by a single fault) occurred in the processing operation.

Similarly, for the other specified value of C the first output of the adder is representative of the IDENTITY function and the second output thereof is available for processing to provide a check quantity.

If the first above-specified value of C is applied to the adder, a cyclically shifted version of the second output is representative of the AND function. On the other hand, if the other value of C is applied to the adder, the cyclically shifted second output thereof is representative of the OR function. In both of these cases the first output of the adder is available to be processed by residue-class-coding techniques to check for the occurrence of errors in the described embodiment.

It is a feature of the present invention that the outputs of a carry-save adder be utilized in a processing system to represent desired logical functions and to check for the occurrence of errors in the system.

It is another feature of this invention that one output of a carry-save adder be processed by residue-class-coding techniques to furnish a quantity available for error-checking purposes.

More specifically, it is a feature of the present invention that two $n$-bit operands and an $n$-bit control quantity be applied to a carry-save adder to provide one output that is a form of a desired logical function and a second output that is utilized for residue-class-checking purposes.

DESCRIPTION OF THE DRAWING

A complete understanding of the present invention and of the above and other objects, features and advantages thereof may be gained from a consideration of the following detailed description of a specific illustrative embodiment thereof shown hereinbelow in connection with the accompanying single-FIGURE drawing.

DETAILED DESCRIPTION

Before proceeding to a description of the specific illustrative apparatus shown in the drawing, it will be helpful to a more complete understanding thereof to present briefly some background material.

In general, arbitrarily large integers cannot be uniquely represented in a digital computer. According to the Euclidean division algorithm, however, any integer $\alpha$ may be represented uniquely by $\alpha=qM+R$, where $q$, $M$ and $R$ are also integers. $M$ is fixed and positive and $0\leq R < M$. R is called the residue of $\alpha$ modulo $M$ and is usually written $|\alpha|_M$. Integers then, can be represented in a machine by their residues modulo some fixed integer $M$ and this representation is unique provided the represented integers fall within some restricted range. The restricted range of the machine is the set of all residues $M$ where $M$ is $p^n$ or $p^n-1$, $p$ is the machine number base and $n$ is the maximum number of digits in the representation. One possible range of integers correctly represented is $0\leq\alpha<M$. However, the range of integers usually assumed to be represented in the machine is $$-\frac{M}{2}\leq\alpha\leq-1 \text{ for } M=p^n$$

$$-\frac{M+1}{2}+1\leq\alpha\leq\frac{M+1}{2}-1 \text{ for } M=p^n-1$$

This representation is unique because the representation for a negative integer $-\alpha$, $\alpha>0$, is $|-\alpha|_M=|M-|\alpha|_M|_M$ To take a specific binary example, let $p=2$, $n=8$ and $\alpha=13$. Then if $M=2^8-1$ $A=|13|_{2^8-1}0000\ 1101$ $-A=|2^8-1-|13|_{2^8-1}|_{2^8-1}$ $=|1111\ 1111-0000\ 1101|_{2^8-1}$ $=1111\ 0010$ $A-A=|0000\ 1101+1111\ 0010|_{2^8-1}$.

$=|1111\ 1111|_{2^8-1}=0$

It follows from the Euclidean division algorithm that the set of $M$ distinct residues form a ring with the operations of addition and multiplication defined as $|\alpha+\beta|_M=||\alpha|_M+|\beta|_M|_M$ $|\alpha\cdot\beta|_M=||\alpha|_M\cdot|\beta|_M|_M$.

It also follows for an integer $g<M$ and $\alpha+\beta=\alpha+\beta_M$, that $||\alpha+\beta|_M|_g=||\alpha|_g+|\beta|_g|_g$ Similarly, if $\alpha\cdot\beta=|\beta\cdot\beta|_M$, then $||\alpha\cdot\beta|_M|_g=||\alpha|_g\cdot|\beta|_g|_g$.

However, if $\alpha+\beta=aM+|\alpha+\beta|_M$, then $||\alpha+\beta|_M|_g=||\alpha|_g+|\beta|_g+|qM|_g|_g$ and if $\alpha\cdot\beta=gM+|\alpha\cdot\beta|_M$, then $||\alpha\cdot\beta|_M|_g=||\alpha|_g\cdot|\beta|_g\cdot|qM|_g|_g$ thus $||\alpha+\beta|_M|_g=||\alpha|_g+|\beta|_g|_g$ $||\alpha\cdot\beta|_M|_g=||\alpha|_g\cdot|\beta|_g|_g$ for all $\alpha$ and $\beta$, if and only if $M_g=0$.

In accordance with the principles of the present invention, it has been determined that the AND, OR EXCLUSIVE-OR and IDENTITY logical operations can be checked for errors using modulo $g$ residue-class-codes. This is accomplished by treating the binary vector operands as $n$-bit binary integers with $M=2^n-1$. To carry out the checking process, $g$ is selected to be equal to $p^k-1$, where $k$ is less than $n$ and $|n|_k=0$. Also, in the checking process the modulo $g$ residue of a number is formed by treating the number as composed of groups of $k$ consecutive digits. In turn, these groups are combined in a modulo $g$ adder to generate check digits for the number.

A specific illustrative system made in accordance with the principles of this invention is shown in the drawing. This system includes a source 100 for providing two $n$-digit operands whose representative digits are to be AND'ed, OR'ed, EXCLUSIVE-OR'ed or IDENTITY'ed. Signals representative of one operand appear on lead 102 and signals representative of the other operand appear on lead 104. These operand signals are applied to a conventional carry-save adder 110 which may, for example, be of the type described in "-High-Speed Arithmetic in Binary Computers," *Proceedings of the IRE*, Vol. 49, No. 1, pp. 75–76, Jan. 1961, by O. L. MacSorley.

An $n$-digit control quantity supplied by a source 112 is also applied to the carry-save adder 110.

For illustrative purposes and to facilitate the description of the depicted system, the terms $p$ and $k$ noted above will each be assumed to equal 2. Hence, only binary numbers will be considered. For these illustrative examples $g$=3. Further, $n$ will be assumed to equal 8. Thus, each quantity or word supplied by the sources 100 and 112 will include eight binary digits. The carry-save adder 110 shown in the drawing is adapted to add three eight-bit integers A and B (the operands) and C (the control quantity) and to produce on lines 114 and 116 two eight-bit integers X and Y as partial results. This operation may be represented as:

$$|A+B+C|_M=|X+Y|_M$$

where $X: x_i=a_i \;\; b_i \;\; c_i$ (1)

$Y: y_{i+1}=a_ib_i \vee b_ic_i \vee a_ic_i,\ y_o=y_n$ (2) In expressions (1) and (2) the symbol ⊕ specifies the EXCLUSIVE-OR operation and $v$ indicates the OR operation. (Later below the symbols Λ and I will be employed to designate the AND and IDENTITY functions, respectively.)

Thus $X$ as defined by (1) is seen to be the mod-2 vector sum of the input quantities $A$, $B$ and $C$, and $Y$ is the vector made up of the carries developed in mod-$M$ addition. If, in accordance with the principles of the present invention, the control quantity $C$ is chosen to be the all-0 word, then expressions (1) and (2) above can be rewritten as follows:

$$X: x_i=a_i \;\; b_i \;\; 0=a_i \;\; b_i \qquad (3)$$

$$Y: y_{i+1}=(a_i\Lambda b_i) \vee (b_i\Lambda 0) \vee (a_i\Lambda 0)=a_i\Lambda b_i (4)$$

$$y_o=a_{n-1}\Lambda b_{n-1}$$

The partial result (3) is seen to be the vector sum or EXCLUSIVE-OR of the two operands $A$ and $B$, and the partial result (4) is recognized to be very close to the logical product or AND function of $A$ and $B$. In particular a single cyclic shift of $Y$ give the AND function of $A$ and $B$ exactly. In other terms:

$$X=A \;\; b \qquad (5)$$

$$Y=|2\cdot(A \Lambda B)|_M \qquad (6)$$

Moreover, if the control quantity $C$ is chosen to be the all-1 word, expressions (1) and (2) can be rewritten as follows:

$$X: x_i=a_i \;\; b_i \;\; 1=\overline{a_i \;\; b_i} \qquad (7)$$

$$X: y_{i+1}=a_ib_i \vee b_i \vee a_i=a_i \vee b_i \qquad (8)$$

$$y_o=a_{n+1} \vee b_{n+}$$

$X$ in expression (7) is representative of the IDENTITY operation, whereas a single cyclic shift of $Y$ in (8) will give the OR function; that is, $$X=\overline{A \;\; B} \qquad (9)$$

$$Y=|2\cdot(A \vee B)|_M \qquad (10)$$

Thus, to realize any of these four operations (AND, OR, EXCLUSIVE-OR and IDENTITY) on two operands $A$ and $B$, $C$ is set to either all-0 or all-1 and a carry-save addition (but the unit 110) is performed on the quantities $A$, $B$ and $C$. One of the two partial results $X$ and $Y$ is a form of the final result $V$. As specified below, the other partial result is available for checking purposes. If the operands are checked by utilizing a mod-$g$ residue-class-code [that is, if $C(A)=|A|_g$, $C(B)=|B|_g$ and $C(C)=|C|_g=0$], then the check digits on one partial result of the carry-save addition process constitute the mod-$g$ sum of the operand checks minus the check of the other partial sum; that is, $$C(X)=|X|_g=|C(A)+C(B)-|Y|_g|_g \qquad (11)$$

$$C(Y)=|Y|_g=|C(A)+C(B)-|X|_g|_g \qquad (12)$$

The check on the final result $V$, however, must be developed from the operations required to extract the final result from one of the partial results. Such an extraction or translation is required for the AND and OR operations and consists of a single cyclic right shift of the partial result $Y$ thereby to generate the desired output quantity $V$. To obtain the check quantity associated with this output quantity $V$, it is necessary that the noted cyclic right shift also be performed in the process of generating the check quantity.

The logical operations AND, OR, EXCLUSIVE-OR and IDENTITY and the corresponding check algorithms therefor as formulated in accordance with the principles of the present invention are exactly specified below (wherein $2^{-1}$ signifies a cyclic right shift):

AND: $V_\Lambda=A\Lambda B=|2^{-1}\cdot Y|_M\ (C=0, 0, \ldots .0)$ (13)

$C_\Lambda(V)=|2^{-1}\cdot(C(A)+C(B)-|X|_g)|_g$ (14)

OR: $V_v=A \vee B=|2^{-1}\cdot Y|_M\ (C=1, 1, \ldots .1)$ (15)

$C_v(V)=|2^{-1}\cdot(C(A)+C(B)-|X|_g)|_g$ (16)

EXCLUSIVE-OR: $V \;=A \;\; B=X\ (C=0, 0, \ldots .0)$ (17)

$C \;\;(V)=|C(A)+C(B)-|Y|_g|_g$ (18)

IDENTITY: $V_I=\overline{A \;\; B}=X\ (C=1, 1, \ldots .1)$ (19)

$C_I(V)=|C(A)+C(B)-|Y|_g|_g$ (20)

The illustrative apparatus shown in the drawing is adapted to carry out the logical and check operations specified above. Consider, for example, the AND function of two eight-digit binary operands $A$ and $B$ whose respective values are, say, 11110010 and 01000110. It is apparent by inspection that digit-by-digit ANDing of these two operands is represented by the quantity 01000010. Accordingly, it is this last specified quantity that should appear on the output line 120 of the depicted apparatus. That this in fact occurs will be set forth in detail below.

The operands $A$ and $B$ to be AND'ed are supplied by the source 100 to the carry-save adder 110. In addition, to carry out the AND operation as indicated in expression (13), the source 112 supplies the control quantity 00000000 to the adder 110. The adder processes these inputs to provide two outputs. One of these outputs, as specified previously, is an eight-bit word whose respective digits are the mod 2 sums of the corresponding digits of $A$, $B$ and $C$. For the particular values of $A$, $B$ and $C$ assumed above, this sum word $X$ has the value 10110100. The other output $Y$ is the vector made up of the carries developed in mod M addition, as indicated in expression (2) above. For the specified $A$, $B$ and $C$ values, this other output has the value 10000100. To implement the AND operation, the adder applies $Y$ to the output lead 114 and applies $X$ to the output lead 116.

The quantity $Y$ generated by the adder 110 is applied to a cyclic right shift unit 122. The function of the unit 122 is to translate the quantity $Y$ by stripping off the rightmost digit thereof and placing that digit immediately before the leftmost digit of $Y$. Thus, the unit 122, which may illustratively comprise a conventional circulating shift register, responds to a control signal on lead 124 to convert the above-indicated $Y$ representation (10000100) to the word 01000010. This latter word, which is applied by the unit 122 to the output line 120, is seen to constitute in fact the AND function of $A$ and $B$.

The quantity $X$ generated by the carry-save adder 110 is applied via the lead 116 to a mod-$g$ residue unit 126. (As indicated above $g$ herein is assumed to equal 3.) The unit 126 is adapted to calculate the quantity $|X|_g$ included in expression (14). Illustratively, this is done by the unit 126 by treating the eight-digit input thereto as composed of four groups of two digits each. In turn these groups are added mod 3. (In mod 3 addition 00+00=00, 01+00=01, 10+00=10, 11+00=11, 01+01=10, 01+10=11, 01+11=01, 10+10=01, 11+10=10 and 11+11=11.)

Thus, the manner in which the quantity 10110100 applied to the unit 126 is processed therein may be represented as $|10+11+01+00|_3$. In accordance with the mod 3 addition rules specified above, the output of the unit 126 is therefore the two-digit number 11, which is representative of the quantity $|X|_g$ in expression (14). This output is applied to a conventional complement unit 128 which merely changes each applied digit to the opposite binary representation (that is 00 is changed to 11, 11 to 00, 01 to 10 and 10 to 01). This complementing operation with respect to the quantity $|X|_g$ is advantageous so that the translated number may be subsequently combined in an adder with the sum of the terms $C(A)$ and $C(B)$.

The terms $C(A)$ and $C(B)$ in expression (14) are generated by a mode 3 residue unit 130 whose mode of operation is identical to that of the previously described unit 126. Thus, the unit 130 processes 11110010 (the quantity $A$) to provide the number 10 on lead 132 and processes 01000110 (quantity $B$) to provide the number 01 on lead 134. In turn these two-digit quantities are combined in a mod 3 adder 136 (in accordance with the mod 3 addition rules set out above) to provide the number 11 on lead 138. Thus, the number on the lead 138 is seen to represent the partial sum $|C(A)=C(B)|_3$ included in expression (14).

Next, the above-indicated partial sum 11 is combined in another mod 3 adder 140 with the aforementioned number 00, which is the complement of $X_g$. The output of the adder 140 is the number 11, which, according to expression (14), must then by cyclically right shifted. This shifting operation, which is accomplished in a unit 142 that may be identical in type to the unit 122 (but of a smaller size), results in the number 11 appearing on lead 144.

In view of the above, it is apparent that the check number appearing on the lead 144 has been formed in accordance with expression (14). This number is applied to a mod 3 compare unit 146 which alone of all the various units shown in the drawing is assumed to be error free. (In practice this can be realized, for example, by replicating the unit 146.) The other input to the compare unit 146 is a check number derived directly from the desired logic output quantity $V$. This derivation is carried out by a mod 3 residue unit 148 whose mode of operation is identical to that of the units 126 and 130.

For the particular example considered herein, wherein $V$=01000010, the output of the unit 148 is the number 11. This number is applied by a lead 150 to the compare unit 146. Since in this example the inputs to the unit 146 are each 11, the unit 146 would provide a status signal on lead 152 indicative of the correctness of the AND function representation appearing on the lead 120.

To illustrate the error-detecting capabilities of the depicted apparatus, assume that a malfunction occurs in, say, the carry-save adder 110. In particular, assume that one bit of the partial result applied to the lead 114 is erroneous. For example, instead of the adder 110 generating the above-indicated word 10000100 as the quantity $Y$, assume that the word applied to the lead 114 is 10100100 (the erroneous bit is underlined for emphasis). Cyclic right shifting of this erroneous result gives the number 01010010, which is the output quantity $V$ applied to the output lead 120. This output is, of course, not representative of the AND function of 11110010 and 01000110.

The mod 3 residue unit 148 responds to the above-assumed erroneous output representation 01010010 to generate the word 01. In turn the unit 146 compares this word with the previously described number 11 which is applied thereto by the lead 144. As a result of this comparison operation, the unit 146 provides a signal on the lead 152 indicative of an error occurrence in the herein-described apparatus.

The apparatus shown in the drawing is also adapted to implement and check the OR operation. As specified by expressions (15) and (16), this is carried out exactly as described above for the AND function except that an all-1 rather than an all-0 control word is applied to the carry-save adder 110 from the source 112.

To implement the EXCLUSIVE-OR function an all-0 control word is applied to the carry-save adder 110 from the source 112. In addition, for this function the adder 110 is controlled to apply the quantities $X$ and $Y$ to the leads 114 and 116, respectively. As seen from expression (17) the quantity $X$ without any further processing is representative of the EXCLUSIVE-OR function. Hence, for this operation the unit 122 is inhibited by a control signal applied thereto from the source 112, whereby $X$ is passed through the unit 122 in an unaltered form to appear on the lead 120 as the desired output logical representation. Additionally, the cyclic right shift unit 142 is also inhibited by the same control signal. As a result, the output of the adder 140 is passed without alteration to the compare unit 146.

As specified above, the quantity $Y$ is applied to the lead 116 in carrying out the EXCLUSIVE-OR operation. Processing and combining of this quantity with the sum of $C(A)$ and $C(B)$ are then carried out in the units 128 and 140 in exactly the same manner described above in connection with the AND and OR functions. Finally, the 2-bit check representation provided by the unit 142 is applied to the compare unit 146 for matching against the 2-bit check quantity derived by the unit 148 from the output logical representation $V$.

If expressions (17) and (18) definitive of the EXCLUSIVE-OR operation are implemented exactly as described above, except that the all-1 control word rather than the all-0 word is applied to the carry-save adder 110 from the source 112, the IDENTITY operation is carried out and checked by the depicted apparatus. The IDENTITY operation and the check algorithm therefore are respectively specified above by expressions (19) and (20).

It is to be understood that the above-described arrangements are only illustrative of the application of the principles of the present invention. In accordance with these principles, numerous other arrangements may be devised by those skilled in the art without departing from the spirit and scope thereof.

I claim:

1. Apparatus for processing two input operands $A$ and $B$ and an input control quantity $C$ to provide a first output quantity representative of a specified one of the AND, OR, EXCLUSIVE-OR and IDENTITY functions of $A$ and $B$ and to provide a residue code check on said first output quantity and to provide a second output quantity representative of a residue code check of the specified function and to compare said residue code checks, said apparatus comprising a carry-save adder, means for applying the quantities $A$, $B$ and $C$ to said adder, said adder being responsive to said quantities $A$, $B$ and $C$ to provide two partial results, means responsive to one of said partial results for providing said first output quantity, generating means responsive to $A$ and $B$ and to said other partial result for providing a residue code check on said specified function, check means for performing a residue code check on said first output quantity, and means for comparing the respective checks provided by said generating means and said check means, wherein said generating means comprises a first modulo $g$ residue unit responsive to said second partial result for providing a first check number representative thereof, a complement unit responsive to said first check number for providing a second check number representative of the complement of said first check number, a second modulo $g$ residue unit responsive to $A$ and $B$ for providing third and fourth check numbers respectively representative thereof, a first modulo $g$ adder responsive to said third and fourth check numbers for providing a fifth check number representative of the sum thereof, a second modulo $g$ adder responsive to said second and fifth check numbers for providing a sixth check number, and a first cyclic right shift unit responsive to said sixth check number for applying a seventh check number to said comparing means, wherein $M=p^n-1$, $g=p^k-1$ and $|n|_k=0$, where $p$, $n$, $M$, $g$ and $k$ are defined as follows:

$n$ is the word size in digits of each of $A$, $B$ and $C$, $p$ is the number base of the apparatus, $M$ is the number modulus of the apparatus, $k$ is the check quantity size in digits, and $g$ is the check modulus.

2. Apparatus as in claim 1 wherein said check means comprises a third modulo $g$ residue unit, and wherein said comparing means comprises a modulo $g$ compare unit.

3. Apparatus as in claim 2 wherein said means for providing said first output quantity comprises a second cyclic right shift unit.

4. Apparatus as in claim 3 further including means for applying signals to said first and second shift units for selectively controlling said units to perform cyclic right shift operations on applied input signals or to pass applied input signals therethrough in unaltered form.

5. In combination, a carry-save adder responsive to two input operands $A$ and $B$ and a control quantity $C$ for providing first and second representations designated $X$ and $Y$, means responsive to one of said representations $X$ and $Y$ for providing an output quantity $V$ representative of a specified logical function of $A$ and $B$, means responsive to said quantity $V$ for calculating a modulo $g$ residue check number therefrom, means responsive to the other one of said representations $X$ and $Y$ and to said operands $A$ and $B$ for generating a residue check number therefrom in accordance with one of the following expressions:

a. $|2^{-1} \cdot (|A|_g + |B|_g - |X|_g)|_g$ and $C=0, 0, \ldots 0$
b. $|2^{-1} \cdot (|A|_g + |B|_g - |X|_g)|_g$ and $C=1, 1, \ldots 1$
c. $|(|A|_g + |B|_g - |Y|_g)|_g$ and $C=0, 0, \ldots 0$
d. $|(|A|_g = |B|_g - |Y|_g)|_g$ and $C=1, 1, \ldots 1$ wherein $g=p^k-1$, where $p$ and $k$ are defined as follows:
$p$ is the number base of the apparatus
$k$ is the check quantity size in base $p$ digits
and where $2^{-1}$ designates a cyclic right shift operation, and means for comparing said residue check numbers.

* * * * *

UNITED STATES PATENT OFFICE
CERTIFICATE OF CORRECTION

Patent No. 3,624,373 Dated November 30, 1971

Inventor(s) Ronald H. Birchall

It is certified that error appears in the above-identified patent and that said Letters Patent are hereby corrected as shown below:

Column 2, line 31, the expression "$-\frac{M}{2} \leq \alpha \leq -1$ for $M=p^n$" should read -- $-\frac{M}{2} \leq \alpha \leq \frac{M}{2} - 1$ for $M = p^n$ --. Column 2, line 41, the expression "$A = |13|2^{8-}10000\ 1101$" should read --$A = |13|_{2^8-1} = 0000\ 1101$--. Column 2, line 42, the expression "$-A = |2^8-1-|13|2^8-1|2^8-1$" should read -- $-A = |2^8-1-|13|_{2^8-1}|_{2^8-1}$ --. Column 2, line 53, after =, "$\alpha + \beta_M$" should be changed to -- $|\alpha + \beta|_M$ --. Column 2, line 55, the expression "$\alpha\cdot\beta = |\beta\cdot\beta|_M$" should read --$\alpha\cdot\beta = |\alpha\cdot\beta|_M$--. Column 2, line 57, that part of the expression reading "$\alpha M$" should read --qM--. Column 2, line 59, that part of the expression reading "gM" should read --qM--. Column 2, line 64, the expression "$M_g=0$" should read -- $|M|_g=0$ --. Column 3, equation (1) should read -- $X: x_i = a_i \oplus b_i \oplus c_i$ --. Column 3, equation (3) should read --$X: x_i = a_i \oplus b_i \oplus 0 = a_i \oplus b_i$--. Column 3, equation (5) should read --$X = A \oplus b$--. Column 3, equation (7) should read

UNITED STATES PATENT OFFICE
CERTIFICATE OF CORRECTION

Patent No. 3,624,373 Dated November 30, 1971

Inventor(s) Ronald H. Birchall

It is certified that error appears in the above-identified patent and that said Letters Patent are hereby corrected as shown below:

--X: $x_i = a_i \oplus b_i \oplus 1 = \overline{a_i \oplus b_i}$ --. Column 3, equation (8), the introduction should be --Y:--, not "X:". The second line of equation (8) should read --$y_o = a_{n-1} \vee b_{n-1}$--. Column 3, equation (9) should read --$X = \overline{A \oplus B}$--. Column 3, line 64, "but" should be changed to --by--. Column 4, equation (15), that part which reads "$V_r$" should read --$V_v$--. Column 4, equation (16), that part which reads "$C_r(V)$" should read --$C_v(V)$--. Column 4, equation (17), the first part should read --EXCLUSIVE-OR: $V_{\oplus} = A \oplus B = X$--. Column 4, equation (18), the first part should read --$C_{\oplus}(V) =$ --. Column 4, equation (19), the first part should read --IDENTITY: $V_I = \overline{A \oplus B}$--. Column 5, line 9, "mode" should read --mod--. Column 5, line 17, the equal sign should be a plus sign. Column 5, line 52, "10100100" should read --10100100--. Column 5, line 54, "01010010" should read --01$\overline{0}$10010--. Column 5, line 58, "01010010"should read --0101$\overline{0}$010--. Column 8, line 10, the first equal sign should be a plus sign.

Signed and sealed this 22nd day of August 1972.

(SEAL)
Attest:

EDWARD M.FLETCHER,JR.
Attesting Officer

ROBERT GOTTSCHALK
Commissioner of Patents